(12) United States Patent  
McKinnon et al.

(10) Patent No.: US 8,661,084 B1
(45) Date of Patent: Feb. 25, 2014

(54) METADATA BASED PLATFORM FOR ACCESSING AND MANAGING MULTIPLE HETEROGENEOUS INFORMATION SERVICES

(75) Inventors: Todd McKinnon, San Francisco, CA (US); Matthew Mihic, San Francisco, CA (US)

(73) Assignee: Okta, Inc., San Francisco, CA (US)

( * ) Notice: Subject to any disclaimer, the term of this patent is extended or adjusted under 35 U.S.C. 154(b) by 342 days.

(21) Appl. No.: 12/870,370

(22) Filed: Aug. 27, 2010

(51) Int. Cl.
*G06F 15/16* (2006.01)

(52) U.S. Cl.
USPC .......................................... 709/206; 709/203

(58) Field of Classification Search
USPC ................................................ 709/203, 206
See application file for complete search history.

(56) References Cited

U.S. PATENT DOCUMENTS

| | | | | |
|---|---|---|---|---|
| 7,596,620 | B1* | 9/2009 | Colton et al. | 709/226 |
| 7,774,485 | B2* | 8/2010 | Patrick et al. | 709/229 |
| 2005/0246415 | A1* | 11/2005 | Belfiore et al. | 709/203 |
| 2007/0130130 | A1* | 6/2007 | Chan et al. | 707/3 |
| 2012/0005236 | A1* | 1/2012 | Deng et al. | 707/798 |

OTHER PUBLICATIONS

Google Apps—Google Code, "SAML Single Sign-On (SSO) Service for Google Apps," Aug. 3, 2010, http://code.google.com/googleapps/domain/sso/saml_reference_implementation.html.
Google Apps—Google Code, "Google Provisioning API Reference Guide," Aug. 3, 2010, http://code.google.com/googleapps/domain/gdata_provisioning_api_v2.0_reference.html.

* cited by examiner

*Primary Examiner* — Asghar Bilgrami
(74) *Attorney, Agent, or Firm* — Fenwick & West LLP

(57) ABSTRACT

A request is received for a service provider to perform an action associated with a canonical feature. Metadata associated with the service provider is used to interact with the service provider in a way that causes the service provider to perform the action.

20 Claims, 29 Drawing Sheets

← 200

|  | Payroll Service Provider | Sales/Marketing Service Provider | Code Repository Service Provider |
| --- | --- | --- | --- |
| Central point of user account creation (Canonical feature 1) | Not supported. | Supported; proprietary API. | Supported; proprietary API. |
| Federated single sign on (Canonical feature 2) | Supported; proprietary API. | Supported; SAML. | Supported; proprietary API. |
| One button user account deactivation (Canonical feature 3) | Not supported. | Supported; proprietary API. | Supported; proprietary API. |

```
                                    ┌─ 1150
┌────────────────────────────────────────────────────────────────────┐
│ - <Upgrade toVersion="3" xmlns="http://www.okta.com/schema/metadata/upgrade"> │
│   + <AddApp name="pivotal">  ◄── 1102                               │
│   </Upgrade>                                                        │
└────────────────────────────────────────────────────────────────────┘

┌─ 1152
┌────────────────────────────────────────────────────────────────────┐
│ - <Upgrade toVersion="3" xmlns="http://www.okta.com/schema/metadata/upgrade"> │
│   - <AddApp name="pivotal">                          ┐             │
│       <website>http://ww.pivotal.com/</website>      │             │
│       <displayName>Pivotal Tracker</displayName>     │             │
│       <description>Pivotal</description>             ├ 1102        │
│     + <links>  ◄── 1104                              │             │
│     + <ssoProtocols mode="EXCLUSIVE">  ◄── 1106      │             │
│     </AddApp>                                        ┘             │
│   </Upgrade>                                                        │
└────────────────────────────────────────────────────────────────────┘

┌─ 1154
┌────────────────────────────────────────────────────────────────────┐
│ - <Upgrade toVersion="3" xmlns="http://www.okta.com/schema/metadata/upgrade"> │
│   - <AddApp name="pivotal">                                         │
│       <website>http://ww.pivotal.com/</website>                    │
│       <displayName>Pivotal Tracker</displayName>                   │
│       <description>Pivotal</description>                           │
│     - <links>                                        ┐             │
│       - <link name="login">                          │             │
│           <destination>/</destination>               │             │
│           <title>Pivotal Tracker</title>             ├ 1104        │
│           <image>/img/logos/pivotal-logo.gif</image> │             │
│           <sortOrder>1</sortOrder>                   │             │
│         </link>                                      │             │
│       </links>                                       ┘             │
│     - <ssoProtocols mode="EXCLUSIVE">                ┐             │
│       - <securePasswordStore>                        │             │
│           <postBackURL>https://www.pivotaltracker.com/signin</postBackURL> │
│           <httpMethod>POST</httpMethod>              │             │
│         - <fields>                                   ├ 1106        │
│             <field name="credentials[username]" value="${user.userName}" /> │
│             <field name="credentials[password]" value="${user.password}" /> │
│           </fields>                                  │             │
│         </securePasswordStore>                       │             │
│       </ssoProtocols>                                ┘             │
│     </AddApp>                                                       │
│   </Upgrade>                                                        │
└────────────────────────────────────────────────────────────────────┘
```

FIG. 11

```
                                        ┌─ 1250
┌──────────────────────────────────────────────────────────────────────────┐
│ - <Upgrade toVersion="47" xmlns="http://www.okta.com/schema/metadata/upgrade"> │
│   + <AddApp name="google">  ◄── 1202                                     │
│   </Upgrade>                                                             │
└──────────────────────────────────────────────────────────────────────────┘

┌─ 1252
┌──────────────────────────────────────────────────────────────────────────┐
│ - <Upgrade toVersion="47" xmlns="http://www.okta.com/schema/metadata/upgrade"> │
│   - <AddApp name="google">                    ┐                          │
│       <website>http://www.google.com</website>│                          │
│       <displayName>Google</displayName>       │                          │
│       <description>Google</description>       │                          │
│       <sortOrder>300</sortOrder>              ├─ 1202                    │
│     + <supportedFeatures>  ◄── 1204           │                          │
│     + <links>                                 │                          │
│     + <orgProperties>                         │                          │
│     + <ssoProtocols mode="EXCLUSIVE">         │                          │
│     </AddApp>                                 ┘                          │
│   </Upgrade>                                                             │
└──────────────────────────────────────────────────────────────────────────┘

┌─ 1254
┌──────────────────────────────────────────────────────────────────────────┐
│ - <Upgrade toVersion="47" xmlns="http://www.okta.com/schema/metadata/upgrade"> │
│   - <AddApp name="google">                                               │
│       <website>http://www.google.com</website>                           │
│       <displayName>Google</displayName>                                  │
│       <description>Google</description>                                  │
│       <sortOrder>300</sortOrder>                                         │
│     - <supportedFeatures>                        ┐                       │
│         <feature>IMPORT_NEW_USERS</feature>      │                       │
│         <feature>IMPORT_PROFILE_UPDATES</feature>│                       │
│         <feature>PUSH_NEW_USERS</feature>        ├─ 1204                 │
│         <feature>PUSH_PROFILE_UPDATES</feature>  │                       │
│         <feature>PUSH_PASSWORD_UPDATES</feature> │                       │
│       </supportedFeatures>                       ┘                       │
│     + <links>  ◄── 1206                                                  │
│     + <orgProperties>                                                    │
│     + <ssoProtocols mode="EXCLUSIVE">                                    │
│     </AddApp>                                                            │
│   </Upgrade>                                                             │
└──────────────────────────────────────────────────────────────────────────┘
```

FIG. 12A

```
     ┌─ 1256
- <Upgrade toVersion="47" xmlns="http://www.okta.com/schema/metadata/upgrade">
  - <AddApp name="google">
      <website>http://www.google.com</website>
      <displayName>Google</displayName>
      <description>Google</description>
      <sortOrder>300</sortOrder>
    + <supportedFeatures>
    - <links>
      - <link name="mail">
          <image>/img/logos/google-mail.png</image>
          <destination>mail</destination>
          <title>Google Mail</title>
          <sortOrder>0</sortOrder>
        </link>
      - <link name="docs">
          <image>/img/logos/google-apps.png</image>
          <destination>docs</destination>
          <title>Google Docs</title>
          <sortOrder>1</sortOrder>
        </link>                                          } 1206
      - <link name="calendar">
          <image>/img/logos/google-calendar.png</image>
          <destination>calendar</destination>
          <title>Google Calendar</title>
          <sortOrder>2</sortOrder>
        </link>
      - <link name="sites">
          <image>/img/logos/google-sites.png</image>
          <destination>sites</destination>
          <title>Google Sites</title>
          <sortOrder>3</sortOrder>
        </link>
      </links>
    + <orgProperties>  ← 1208
    + <ssoProtocols mode="EXCLUSIVE">
    </AddApp>
  </Upgrade>
```

FIG. 12B

```xml
<Upgrade toVersion="47" xmlns="http://www.okta.com/schema/metadata/upgrade">
  <AddApp name="google">
    <website>http://www.google.com</website>
    <displayName>Google</displayName>
    <description>Google</description>
    <sortOrder>300</sortOrder>
    <supportedFeatures>
    <links>
    <orgProperties>
      <property name="domain">
        <label>Domain</label>
        <helpText>Enter the domain for your organization. For example,
          mycompany.com. Okta uses this domain for Single Sign-on to
          Google.</helpText>
        <type>STRING</type>
        <displayOrder>0</displayOrder>
        <updatable>false</updatable>
        <validation>
          <required>true</required>
        </validation>
      </property>
      <property name="adminUserName">
        <label>Administrator username</label>
        <helpText>Enter the Google administrator username for this domain. Only
          enter the part that appears before the @ symbol. For example, if your
          username is <i>bob</i>@mycompany.com, enter <i>bob</i>.</helpText>
        <type>STRING</type>
        <displayOrder>1</displayOrder>
        <updatable>false</updatable>
        <validation>
          <required>true</required>
        </validation>
      </property>
      <property name="adminPassword">
        <label>Administrator password</label>
        <helpText>Enter the password for your Google administrator
          account.</helpText>
        <type>ENCRYPTED_STRING</type>
        <displayOrder>2</displayOrder>
        <updatable>true</updatable>
        <validation>
          <required>true</required>
        </validation>
      </property>
    </orgProperties>
    <ssoProtocols mode="EXCLUSIVE">
  </AddApp>
</Upgrade>
```

1258 — top
1208 — orgProperties block
1210 — ssoProtocols

FIG. 12C

```
                                                                    ┌─ 1260
─ <Upgrade toVersion="47" xmlns="http://www.okta.com/schema/metadata/upgrade">
  ─ <AddApp name="google">
      <website>http://www.google.com</website>
      <displayName>Google</displayName>
      <description>Google</description>
      <sortOrder>300</sortOrder>
    + <supportedFeatures>
    + <links>                                    ┌─ 1210
    + <orgProperties>
  ┌─────────────────────────────────────────────────────────────────────────┐
  │ ─ <ssoProtocols mode="EXCLUSIVE">                                       │
  │   ─ <bookmark>                                                          │
  │       <loginRedirectURL>https://${link.destination}.google.com/a/${org.domain}</loginRedirectURL>│
  │     </bookmark>                                                         │
  │   ─ <saml20>                                                            │
  │       <postBackURL>https://www.google.com/a/${org.domain}/acs</postBackURL>│
  │       <loginRedirectURL>https://${link.destination}.google.com/a/${org.domain}</loginRedirectURL>│
  │       <IPIssuer>google.com/a/${org.domain}</IPIssuer>                   │
  │       <SPIssuerLookup>domain</SPIssuerLookup>                           │
  │       <nameId>${user.userName}</nameId>                                 │
  │       <recipient>https://www.google.com/a/${org.domain}/acs</recipient> │
  │       <audienceRestriction>google.com</audienceRestriction>             │
  │       <authnContextClassRef>urn:oasis:names:tc:SAML:2.0:ac:classes:Password</authnContextClassRef>│
  │       <signResponse>true</signResponse>                                 │
  │       <signAssertion>false</signAssertion>                              │
  │     </saml20>                                                           │
  │   </ssoProtocols>                                                       │
  └─────────────────────────────────────────────────────────────────────────┘
  </AddApp>
</Upgrade>
```

FIG. 12D

```
                                    ┌─ 1352
┌─────────────────────────────────────────────────────────────────┐
│ - <Upgrade toVersion="37" xmlns="http://www.okta.com/schema/metadata/upgrade"> │
│   - <AddApp name="sfdc">                              ┐         │
│       <website>http://www.salesforce.com</website>    │         │
│       <displayName>Salesforce</displayName>           │         │
│       <description>Salesforce</description>           │         │
│       <demoOnly>true</demoOnly>                       │         │
│       <sortOrder>2</sortOrder>                        ├ 1302    │
│     + <links>  ◄── 1304                               │         │
│     + <customTypes>                                   │         │
│     + <orgProperties>                                 │         │
│     + <userProperties>                                │         │
│       <ssoProtocols mode="EXCLUSIVE" />               │         │
│     </AddApp>                                         ┘         │
│   </Upgrade>                                                    │
└─────────────────────────────────────────────────────────────────┘

┌─ 1354
┌─────────────────────────────────────────────────────────────────┐
│ - <Upgrade toVersion="37" xmlns="http://www.okta.com/schema/metadata/upgrade"> │
│   - <AddApp name="sfdc">                                        │
│       <website>http://www.salesforce.com</website>              │
│       <displayName>Salesforce</displayName>                     │
│       <description>Salesforce</description>                     │
│       <demoOnly>true</demoOnly>                                 │
│       <sortOrder>2</sortOrder>                                  │
│     - <links>                                         ┐         │
│       - <link name="mc">                              │         │
│           <image>/img/logos/salesforce_logo.png</image> │       │
│           <destination>/</destination>                ├ 1304    │
│           <title>Salesforce</title>                   │         │
│           <sortOrder>0</sortOrder>                    │         │
│         </link>                                       │         │
│       </links>                                        ┘         │
│     + <customTypes>  ◄── 1306                                   │
│     + <orgProperties>                                           │
│     + <userProperties>                                          │
│       <ssoProtocols mode="EXCLUSIVE" />                         │
│     </AddApp>                                                   │
│   </Upgrade>                                                    │
└─────────────────────────────────────────────────────────────────┘
```

FIG. 13A

```xml
<Upgrade toVersion="37" xmlns="http://www.okta.com/schema/metadata/upgrade">    <!-- 1356 -->
  <AddApp name="sfdc">
    <website>http://www.salesforce.com</website>
    <displayName>Salesforce</displayName>
    <description>Salesforce</description>
    <demoOnly>true</demoOnly>
    <sortOrder>2</sortOrder>
    + <links>
    - <customTypes>                                                              <!-- 1306 -->
      - <customType name="Profile">
        <label>Profile</label>
        <labelPlural>Profiles</labelPlural>
        <displayField>name</displayField>
        <downloadOrder>1</downloadOrder>
        - <properties>
          - <property name="name">
            <label>Name</label>
            <helpText>The name of the profile</helpText>
            <type>STRING</type>
            <displayOrder>0</displayOrder>
          </property>
        </properties>
      </customType>
      - <customType name="Role">
        <label>Role</label>
        <labelPlural>Roles</labelPlural>
        <displayField>name</displayField>
        <downloadOrder>2</downloadOrder>
        - <properties>
          - <property name="name">
            <label>Name</label>
            <helpText>The name of the role</helpText>
            <type>STRING</type>
            <displayOrder>0</displayOrder>
          </property>
        </properties>
      </customType>
    </customTypes>
    + <orgProperties>     <!-- 1308 -->
    + <userProperties>
    <ssoProtocols mode="EXCLUSIVE" />
  </AddApp>
</Upgrade>
```

FIG. 13B

```
1358
- <Upgrade toVersion="37" xmlns="http://www.okta.com/schema/metadata/upgrade">
  - <AddApp name="sfdc">
    <website>http://www.salesforce.com</website>
    <displayName>Salesforce</displayName>
    <description>Salesforce</description>
    <demoOnly>true</demoOnly>
    <sortOrder>2</sortOrder>                    1308
    + <links>
    + <customTypes>
    - <orgProperties>
      - <property name="adminUsername">
        <label>Salesforce username</label>
        <helpText>Enter the Salesforce <strng>administrator username</b> for your organization. For example,
            administrator@company.com.</helpText>
        <type>STRING</type>
        <displayOrder>0</displayOrder>
        - <validation>
          <required>true</required>
          </validation>
        </property>
      - <property name="adminPassword">
        <label>Salesforce password + token</label>
        - <helpText>
          - <![CDATA[
                              <p>
                                      Enter your Salesforce <strong>administrator password</strong>
                                      and append your Salesforce <strong>security token</strong> to
                                      your password.  For example, if your password is
                                      <strong>myPassword</strong> and your security token is
                                      <strong>XXXXXXX</strong>, you will enter
                                      <strong>myPasswordXXXXXXX</strong>.
                                      </p>

<p><strong>Where do I get my Salesforce security token?</strong></p>
                      <ul class="bullets">
                          <li>Log in to your Salesforce account with your administrator
                              user account to have your security token emailed to
                              you.</li>
                          <li>Once logged in, click <strong>My Personal
                              Information</strong> under <strong>Personal
                              Setup</strong> then click <strong>Reset Security
                              Token</strong>.</li>
                          <li>Your security token will be emailed to you.</li>
                              </ul>
          ]]>
        </helpText>
        <type>ENCRYPTED_STRING</type>
        <displayOrder>0</displayOrder>
        - <validation>
          <required>true</required>
          </validation>
        </property>
      </orgProperties>
    + <userProperties>
    <ssoProtocols mode="EXCLUSIVE" />
    </AddApp>
  </Upgrade>

```
  ┌─ 1360
- <Upgrade toVersion="37" xmlns="http://www.okta.com/schema/metadata/upgrade">
  - <AddApp name="sfdc">
    <website>http://www.salesforce.com</website>
    <displayName>Salesforce</displayName>
    <description>Salesforce</description>
    <demoOnly>true</demoOnly>
    <sortOrder>2</sortOrder>
  + <links>
  + <customTypes>
  + <orgProperties>
  - <userProperties>
    - <property name="profile">
      <label>Profile</label>
      <helpText>The user's profile</helpText>
      <type>REFERENCE</type>
      <referencedType>Profile</referencedType>
      <displayOrder>0</displayOrder>
      <updatable>true</updatable>
      - <validation>
        <required>true</required>
      </validation>
    </property>
    - <property name="role">
      <label>Role</label>
      <helpText>The user's role</helpText>
      <type>REFERENCE</type>
      <referencedType>Role</referencedType>
      <displayOrder>1</displayOrder>
      <updatable>true</updatable>
      - <validation>
        <required>true</required>
      </validation>
    </property>
    </userProperties>
    <ssoProtocols mode="EXCLUSIVE" />
  </AddApp>
  </Upgrade>
```

Integration Summary — 1400

| | Supported? |
|---|---|
| Sign-On Mode | |
| Federation | Yes |
| Secure password store | Yes |
| Bookmark | Yes |
| User Management | |
| User provisioning/de-provisioning | Yes |
| Batch user import | Yes |
| Two-way user data synch | Yes |
| One-way user data synch | Yes |
| Mass change to users | No |
| *User lock out* | No |

> Warning: service provider does not support user lock out integration. Cannot prevent a user from logging in directly to service provider even after account is deactivated at service management server.  — 1402

```
                                    ┌─ 1600
<Upgrade toVersion="101"    xmlns="http://www.saasure.com/schema/metadata/upgrade">

<!-- Plugin app metadata. One property (siteURL), three sites monitored -->
  <AddApp name="test_plugin_app">
    <website>http://okap192.appsport.com</website>
    <displayName>Test Plugin App</displayName>
    <description>Test app for verifying plugin behavior</description>
    <testOnly>true</testOnly>
    <sortOrder>1000</sortOrder>
    <logoImage>/img/logos/okta-logo-black.png</logoImage>

<links>
       <link name="login">
          <image>/img/logos/okta-logo-black.png</image>
          <destination>/</destination>
          <title>Plugin Test App</title>
          <sortOrder>0</sortOrder>
       </link>
    </links>

<orgProperties>
       <property name="siteURL">
          <label>Site URL</label>
          <helpText>Site URL</helpText>
          <type>STRING</type>
          <displayOrder>0</displayOrder>
          <validation>
             <required>true</required>
          </validation>
       </property>
    </orgProperties>
    - - - - - - - - - - - - - - - - - - - - - - - - - - - - - - - - - - - - - - -
    <ssoProtocols mode="EXCLUSIVE">                                        ⎫
       <browserPlugin>                                                     ⎪
          <loginRedirectURL>${org.siteURL}</loginRedirectURL>               ⎪
       </browserPlugin>                                                    ⎪
    </ssoProtocols>                                                        ⎪
                                                                           ⎬  1602
    <browserPlugin available="true">                                       ⎪
       <sites>                                                             ⎪
          <site url="${org.siteURL}/select-company" script="select-company"/>⎪
          <site url="${org.siteURL}/${org.companyId}/login" script="login"/>⎪
          <site url="${org.siteURL}/ajax-login" script="ajax-login"/>       ⎪
       </sites>                                                            ⎪
    </browserPlugin>                                                       ⎭
    - - - - - - - - - - - - - - - - - - - - - - - - - - - - - - - - - - - - - - -
    <settings>
       <general>
          <property>siteURL</property>
       </general>
    </settings>
  </AddApp>

<!-- Secure password store app metadata. One property (siteURL), three sites monitored -->
  <AddApp name="test_sps_app">
  ...
```

FIG. 16A

```
...
  <!-- Secure password store app metadata.  One property (siteURL), three sites monitored -->
  <AddApp name="test_sps_app">
     <website>http://okap192.appsport.com</website>
     <displayName>Test Secure Password Store App</displayName>
     <description>Test app for verifying secure password store behavior</description>
     <testOnly>true</testOnly>
     <sortOrder>1000</sortOrder>
     <logoImage>/img/logos/okta-logo-black.png</logoImage>

<links>
        <link name="login">
           <image>/img/logos/okta-logo-black.png</image>
           <destination>/</destination>
           <title>SPS Test App</title>
           <sortOrder>0</sortOrder>
        </link>
     </links>

<orgProperties>
        <property name="siteURL">
           <label>Site URL</label>
           <helpText>Site URL</helpText>
           <type>STRING</type>
           <displayOrder>0</displayOrder>
           <validation>
              <required>true</required>
           </validation>
        </property>
     </orgProperties>

<ssoProtocols mode="EXCLUSIVE">
        <securePasswordStore>
           <postBackURL>${org.siteURL}</postBackURL>
           <httpMethod>POST</httpMethod>
           <fields>
              <field name="p_username" value="${user.userName}"/>            1604
              <field name="p_password" value="${user.password}"/>
           </fields>
        </securePasswordStore>
     </ssoProtocols>

<settings>
        <general>
           <property>siteURL</property>
        </general>
     </settings>
  </AddApp>

</Upgrade>
```

METADATA BASED PLATFORM FOR ACCESSING AND MANAGING MULTIPLE HETEROGENEOUS INFORMATION SERVICES

BACKGROUND OF THE INVENTION

Service providers (e.g., third party service providers) create and provide a number of useful services. In some cases, the service is provided over the web or Internet and is used by one or more employees of a company. These services may be used by an employee to perform a job responsibility (e.g., members of a software team use a web based code revision application to check in code updates and track bugs; an accounting team uploads information to the website of their external auditing company so that an audit can be performed; etc.) or the services may be available to all employees of a company, such as services related to employee benefits (e.g., an employee uses a web based payroll service to change the number of deductions, uses a web based brokerage service to access an employee stock purchase plan or incentive stock options, etc.).

While these services are useful, the task of managing these services (e.g., by a system administrator) and accessing them (e.g., by an employee) can be inconvenient since these services are provided by many different companies and the interfaces and/or capabilities vary from service provider to service provider. It would be desirable if these systems could be managed in a way that made managing the services easier for system administrators and/or made accessing and using the services easier for non-system administrators.

BRIEF DESCRIPTION OF THE DRAWINGS

Various embodiments of the invention are disclosed in the following detailed description and the accompanying drawings.

FIG. 2 is a table showing an embodiment of canonical features and integration support for a plurality of service providers.

FIG. 5A is a diagram showing an embodiment of a user interface associated with one button user account deactivation.

FIG. 11 is a diagram showing an embodiment of metadata associated with a customer relationship management service provider.

FIG. 12A is a diagram showing an embodiment of metadata associated with a multiservice service provider.

FIG. 12B is a diagram showing an embodiment of metadata associated with a multiservice service provider with a links section expanded.

FIG. 12C is a diagram showing an embodiment of metadata associated with a multiservice service provider with an organization properties section expanded.

FIG. 12D is a diagram showing an embodiment of metadata associated with a multiservice service provider with a single sign on (SSO) protocols section expanded.

FIG. 13A is a diagram showing an embodiment of metadata associated with a sales/marketing service provider.

FIG. 13B is a diagram showing an embodiment of metadata associated with a sales/marketing service provider with a custom types section expanded.

FIG. 13C is a diagram showing an embodiment of metadata associated with a sales/marketing service provider with an organization properties section expanded.

FIG. 13D is a diagram showing an embodiment of metadata associated with a sales/marketing service provider with a user properties section expanded.

FIG. 14 is a diagram showing an embodiment of an integration summary.

FIG. 15 is a diagram illustrating an embodiment of a management interface.

FIG. 16A is a diagram showing an embodiment of metadata associated with a browser plugin for single sign on.

FIG. 16B is a diagram showing an embodiment of metadata associated with a secure password store technique used to perform single sign on.

FIG. 17C is a diagram showing an embodiment of a user interface after a browser plugin has been installed.

DETAILED DESCRIPTION

Figure 1:
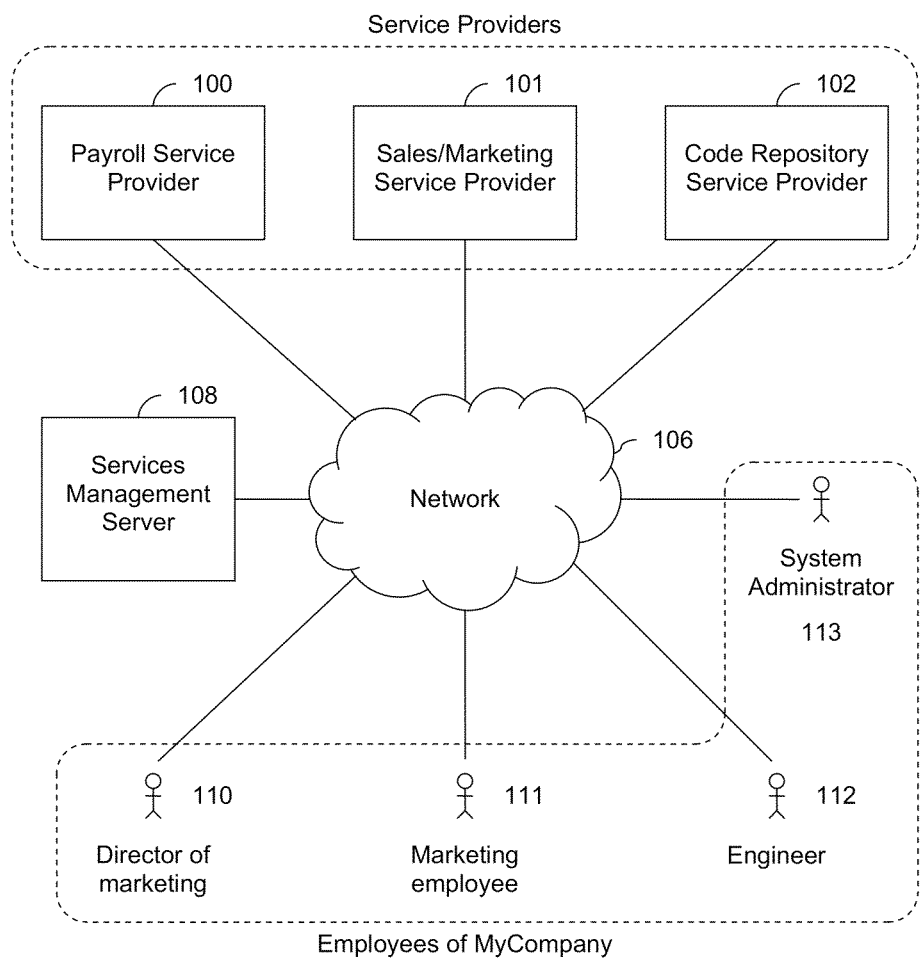
FIG. 1 is a diagram showing an embodiment of a plurality of service providers which provide services to employees of a company.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using metadata to manage a plurality of services associated with a plurality of service providers is described. A request is received for a service provider to perform an action associated with a canonical feature. For example, the service provider may be associated with a calendar or scheduling application and the canonical features relates to logging on, specifically from a signal point of access (e.g., sign on once for all service providers from a single interface). Metadata associated with the service provider is used to interact with the service provider in a way that causes the service provider to perform the action. For example, a processor may access metadata associated with or relating to the service provider and the metadata may instruct or inform the processor how to interact with the service provider. In some embodiments, some functionality is called or executed with appropriate settings (e.g., specific to a user, a service provider, and/or a company); this functionality may be included in the metadata or may be external to the metadata.

FIG. 1 is a diagram showing an embodiment of a plurality of service providers which provide services to employees of a company. Examples of services include, without limitation, software and/or related functionality provided to end users as a remotely or other hosted service, e.g., so-called "software as a service" or SAAS. In the example shown, service providers 100-102 provide services to employees 110-113 of MyCompany. MyCompany is sometimes referred to as an (end user) company and employees 110-113 are sometimes referred to as (end) users.

Payroll service provider 100 provides one or more services related to payroll management and all employees of MyCompany have at least some access to its services. Some examples of payroll service providers include ADP and Intuit and some examples of payroll related services including changing a number of (tax) deductions, changing a routing number and account number for automatic deposit, etc.

Sales/marketing service provider 101 provides one or more services to support sales and/or marketing professionals. Some examples of a sales/marketing service provider include Constant Contact (which provides email marketing services) and salesforce.com (which provides services related to sales and collaborations tracking). As marketing professionals, director of marketing 110 and marketing employee 111 have access to and use services provided by sales/marketing service provider 101. Engineer 112 is not a sales or marking professional and therefore in this example does not have access to services provided by sales/marketing service provider 101 (e.g., she does not have a user account at sales/marketing service provider 101). System administrator 113 in some embodiments has access to sales/marketing service provider 101, for example to resolve any technical issues so that employees 110 and 111 can perform their sales or marketing job responsibilities.

Code repository service provider 102 provides one or more services related to code management. For example, a software product or semiconductor product may comprise a plurality of modules or functions developed by a team of engineers and code repository service provider 102 provides one or more services associated with (for example) checking out a module/function, checking in a new version of a module/function, tracking versions of code or when features are added (e.g., in a comments section), tracking the detection and resolution of bugs, etc. Some examples of code repository service providers include Bugzilla and Codesion. In this example, engineer 112 has access to code repository service provider 102 but employees 110 and 111 do not since they are not engineers. In some embodiments, system administrator 113 has access to code repository service provider 102 in order to support engineer 112.

In some embodiments, services provided by one or more of service providers 100-102 are web based services. In such embodiments the services can (for example) be accessed using Internet protocols and/or by accessing a certain website or URL. In some embodiments, one or more of service providers 100-102 include a web server for communicating with services management server 108 via network 106.

Services management server 108 communicates with service providers 100-102 (on behalf of one or more of employees 110-113) to provide one or more canonical features to employees 110-113. (In some embodiments, services management server 108 is a service provider because in addition to managing access to service providers 100-102, services management server 108 provides its own set of services to one or more of employees 110-113.) A canonical feature as used herein is an operation or action for which a uniform or consistent interaction or experience is attempted to be provided to an end user across multiple service providers. In some embodiments, a service management server or other mediating node is configured to interact with services providers to make one or more canonical features available to end users across services, including by interacting with service providers in a manner required to cause the service provider to perform actions necessary to provide such canonical features, for example as/when invoked by end users. This uniform or consistent experience by the user is (where possible) independent of the underlying set of services provided by a particular service provider and/or the manner or sequence with which interactions with a particular service provider are performed. One example of a canonical feature is to have a central point of user account creation. Services management server 108 attempts to provide an interface in which a system administrator is able to create user accounts (e.g., for a new employee) for all service providers (e.g., relevant for that new employee) from a central or single point which is independent of the underlying account creation steps or interfaces exposed by or used by the (relevant) service providers. The creation of a user account at each of services 100-102 is presented to or experienced by system administrator 113 in the same way, independent of how each of services 100-102 are interacted with (e.g., in the background) to create a new user. This is in contrast to having to go to different locations (e.g., different websites of the service providers) and having different interactions with the services in order to create a user account. This makes the job of system administrator 113 in FIG. 1 easier, since he can create user accounts for a new employee for any of services 100-102 from a single interface or point rather than accessing each service provider individually and entering the same user information repeatedly.

In some embodiments, a canonical feature relates to or is associated with a user account. Some examples include changing user account permissions or settings, changing a group comprising of one or more user accounts, viewing activity for a user account, etc. In some embodiments, a canonical feature is related to security or authorization. For example, a company may want to have employees set passwords that include a capital letter, a number, and a special character; this policy is enforced as part of a canonical feature independent of any individual requirements services 100-102 might have in some embodiments. In some embodiments, a canonical feature is defined by or is in the context of a particular company. Put another way, canonical features for one company may differ from that of another company (e.g., using services of the same service provider) in some embodiments.

Services management server 108 communicates with payroll service provider 100, sales/marketing service provider 101, and code repository service provider 102 as needed to provide canonical features, some examples of which are described in further detail below. This includes services management server 108 performing any prerequisites, translation, mediation, and/or proxying associated with service providers 100-102 as needed. Without services management server 108, users 110-113 may have to access each service provider directly (e.g., the website of each service provider) and may not have a central interface or point of access from which all services can be accessed.

In various embodiments, a variety of communication devices and/or protocols are employed to manage services as described herein. In some embodiments, users 110-113 use an Internet browser application (e.g., Microsoft Internet Explorer or Mozilla Firefox) running on a variety of devices (e.g., on a computer or a smart phone such as an Apple iPhone or a Motorola Droid) to access a web server associated with services management server 108. The web server associated with services management server 108 in turn communicates with service providers 100-102 and relays information between the end users 110-113 and service providers 100-102. In some embodiments, users 110-113 use a special purpose application running on a smart phone (e.g., an app running on an iPhone) to access canonical features associated with service providers 100-102 via services management server 108.

FIG. 2 is a table showing an embodiment of canonical features and integration support for a plurality of service providers. In this example, service providers 100-102 from FIG. 1 and three example canonical features are shown. In some embodiments, metadata includes at least some of the information shown in table 200. In some embodiments there is a metadata file, repository, or table for each service provider (e.g., the information in the left column is in one metadata file, the information in the center column is in another metadata file, etc.).

The first example canonical feature shown in FIG. 2 is a central point of user account creation. This canonical feature enables a system administrator to create—from a single or central interface—new user accounts for those services that are appropriate for that particular employee (e.g., when a new employee is hired or an employee's needs have changed). In contrast, other systems may require a system administrator to go to each service provider's website and re-enter the same user information over and over at each service provider. Payroll service provider (100 in FIG. 1) does not support this canonical feature but sales/marketing service provider (101 in FIG. 1) and code repository service provider (102 in FIG. 1) do using proprietary application programming interfaces (APIs), respectively. For example, the code repository service provider may have implemented its own API and although other devices or entities are able to interface to it, it is relatively unique API. As used herein, an unsupported canonical feature means that that service provider does not expose or provide any interface or functionality with which a services management server can interface or communicate with for that canonical feature. In some embodiments, a service provider which expects (human) users to go directly to a service provider's website and (manually) enter information for a canonical feature is one that does not support that canonical feature.

The second canonical feature shown in this example is single portal access to services. This allows a user (e.g., either a system administrator or a non system administrator) to view and access all the services for which they have user accounts or access from a single portal or interface, for example after signing on only once. This is convenient for the user since she does not need to remember a different URL or portal for each service and local usernames and passwords. The user can also quickly and easily see what services she has access to. In table 200, the payroll service provider supports this canonical feature using a proprietary API; the sales/marketing service provider supports this canonical feature using SAML (Security Assertion Markup Language) and the code repository service provider supports it with a propriety API. In some embodiments, the API associated with the payroll service provider and the API associated with the code repository service provider are different proprietary APIs.

The third example canonical feature is one button user account deactivation. For example, when an employee leaves a company, a system administrator is able to deactivate all user accounts (for all services for which that employee has an account) from a single point, using a single interaction. As used herein, deactivation disables a user's ability to access an account service or services thereof. In some embodiments, deactivation is performed by deleting a user account. In some other embodiments, the user account or user information still exists but the user is no longer able to access services. One button user account deactivation is more convenient than (for example) figuring out which services an employee has an account with, going to each of those service providers (e.g., their website), and deactivating or deleting the account locally and/or individually at each service provider. The sales/marketing service provider supports this canonical feature with a proprietary API, the code repository service provider supports this with a propriety API, and the payroll service provider does not support this canonical feature.

In some embodiments, information, functions, actions, or services that are specific to a particular service or service provider are outside of the domain of canonical features. Put another way, a services management server may not necessarily interfere with service specific data. For example, the second exemplary canonical feature described above is a single portal access to services. In some embodiments, once the user selects one of the service providers from a single point of access (e.g., from a list or graphical interface showing all relevant service providers for that user), a services management server will not perform translation or mediation for subsequent service specific actions and/or information exchanged between the payroll service provider and a user (e.g., one of employees 110-113 in FIG. 1). For example, changing the number of payroll deductions is service specific and is outside of the scope of a canonical feature; a services management server would not necessarily perform any translation or mediation related to changing the number of payroll deductions since the need for a uniform and/or consistent experience does not apply.

The following figures show some example user interfaces that one or more of employees 110-113 in FIG. 1 may be presented with when interacting with services provided by one or more of service providers 100-102. Some of the user interfaces described below relate to the example canonical features shown in FIG. 2.

Figure 3A:
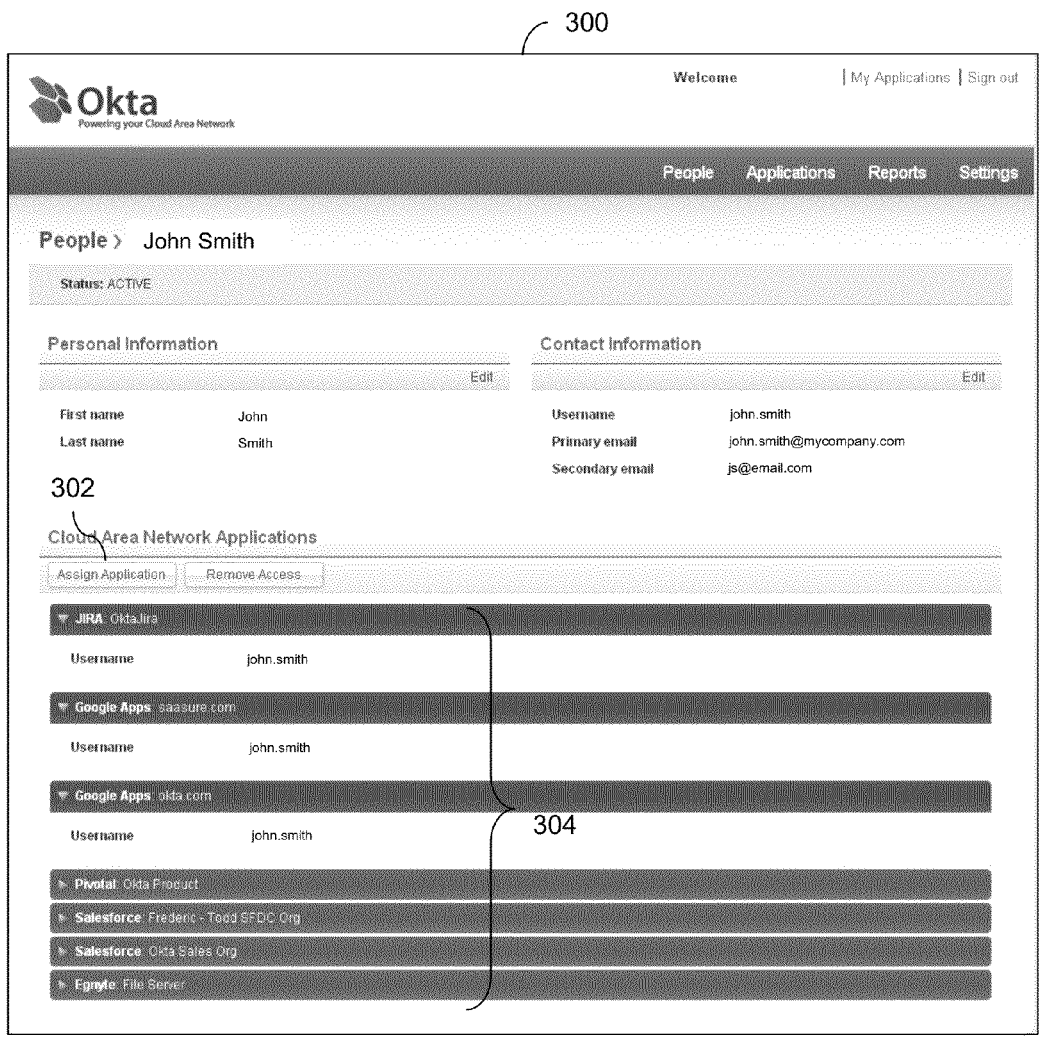
FIG. 3A is a diagram showing an embodiment of a user interface for a central point of user account creation.

FIG. 3A is a diagram showing an embodiment of a user interface for a central point of user account creation. This example shows one embodiment of the first exemplary canonical feature shown in FIG. 2. In the example shown, user interface 300 shows information for an employee, John Smith. In window 304, existing user accounts which have already been created for John Smith are shown. To create a new account for John Smith with another service provider, button 302 is pressed. In some embodiments, user interface 300 is presented to a system administrator (e.g., system administrator 113 in FIG. 1) and one or more user accounts for one of employees 110-112 is created. The next figure shows user interface 300 after button 302 is pressed.

Figure 3B:
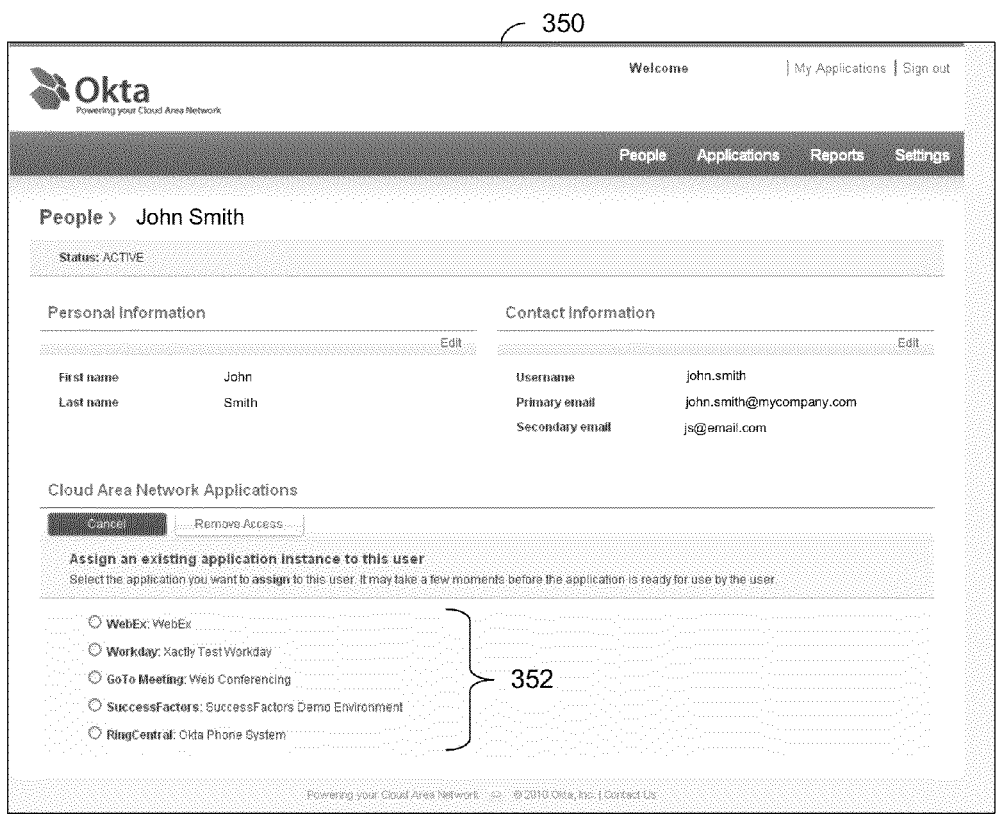
FIG. 3B is a diagram showing an embodiment of a user interface for a central point of user account creation after a button to assign an application is pressed.

FIG. 3B is a diagram showing an embodiment of a user interface for a central point of user account creation after a button to assign an application is pressed. In the example shown, assign application button 302 in FIG. 3A has been pressed and user interface 350 is displayed in response.

In 352, a user (e.g., a system administrator) selects one of five applications to be assigned to the user and in response to the selection a new user account is created with the appropriate service provider (not shown). In some embodiments, multiple applications are able to be assigned to a user account simultaneously if desired (e.g., more than one radio button in 352 can be selected). The specific interfaces, required fields, and/or underlying processing associated with creating a new user account at each of the service providers (i.e., WebEx, Workday, GoTo Meeting, SuccessFactors, and Ring Central) may vary from service provider to service provider and a services management server (e.g., 108 in FIG. 1) communicates with each service provider as needed on behalf of the user (e.g., system administrator 113 in FIG. 1) to create a user account if so requested. This enables a system administrator or other user to perform a certain action (in this case, create a user account) in a uniform and/or consistent manner independent of the service provider and any underlying processing or interfaces. A service provider can change from one interface or underlying process to another without a user (e.g., a system administrator) being aware of it and/or having to interact directly with the new interface or underlying process.

In some embodiments, a services management server has accessed information associated with John Smith (e.g., prior to generating and displaying interface 350) and the applications or services presented in 352 are selected based on John Smith's job requirements, as described in the retrieved information.

Figure 4:
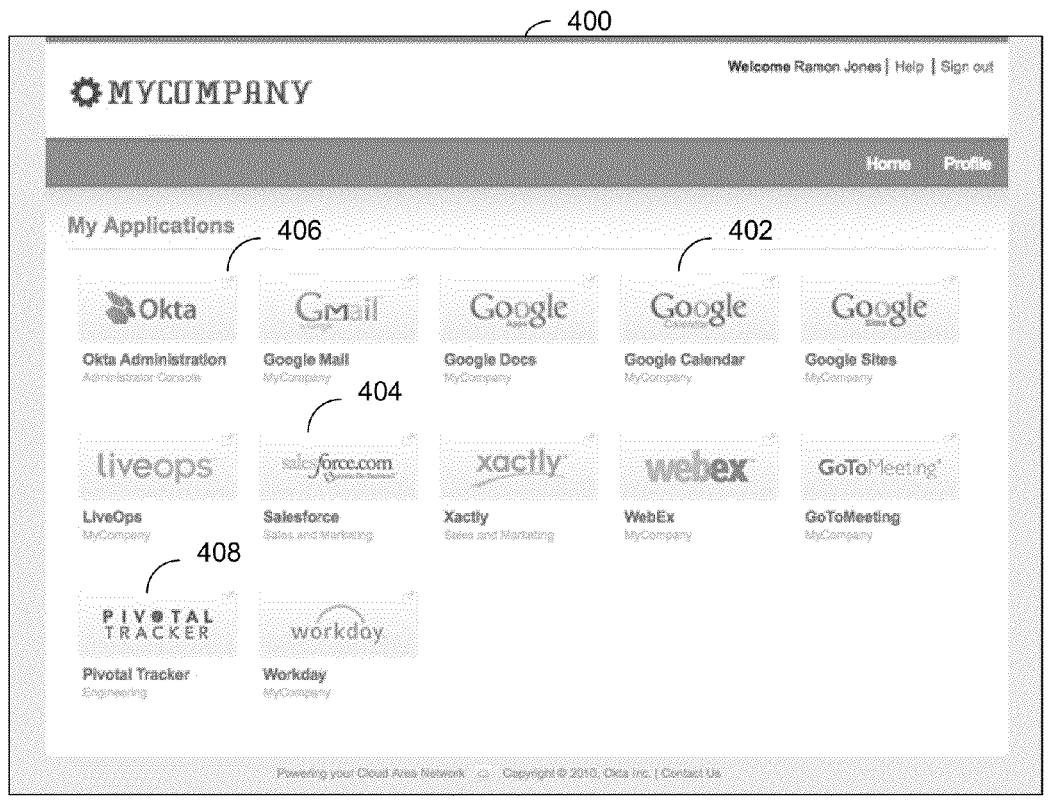
FIG. 4 is a diagram showing an embodiment of a user interface associated with a single portal via which services are accessed.

FIG. 4 is a diagram showing an embodiment of a user interface associated with a single portal via which services are accessed. This example shows one embodiment of the second exemplary canonical feature shown in FIG. 2. In this example, a user (Ramon Jones) is presented with the services to which he has access. From interface 400, Ramon can select a service (e.g., Google Calendar 402) and access functions or actions provided by that service provider (e.g., view appointments and create new appointments). In some embodiments, Ramon enters his username and password once (e.g., prior to being presenting interface 400) and subsequent entry of a user name or password (e.g., in order to access a particular service or service provider) is not required. For example, Ramon would not need to enter his Google user name and Google password in order to access Google Calendar 406.

In some embodiments, in order to get to interface 400, a user goes to a website or portal associated with a services management service (e.g., www.okta.com). In some embodiments, a user goes to a website or portal associated with or accessible from a company's website or intranet (e.g., www.mycompany.com) in order to access interface 400.

In some embodiments, the services for which a user (e.g., Ramon Jones) has access to may be dictated by that employee's job functionality or job requirements. For example, beneath Salesforce icon 404 is displayed "Sales and Marketing." In some embodiments, all sales and marketing professionals have access to at least some Salesforce services. In some cases, a service is made available to all employees. For example, Google Calendar 402 may be made available to all employees. In some embodiments, prior to generating and presenting interface 400, a services management server accesses stored information associated with Ramon Jones, determines what services Ramon has access to, and presents icons associated with those services to Ramon in interface 400.

In some embodiments, administration icon 406 is presented in user interface 400 to a system administrator. For example, by clicking on icon 406, interfaces 300 and 350 from FIGS. 3A and 3B may be accessible. In some embodiments, administration icon 406 is presented to a non-system administrator. Some examples of administration services available to non-system administrators accessed by clicking on administration icon 406 include (but are not limited to): requesting access to additional services for which the user already has a user account but for which some services are currently limited or restricted, requesting creation of a new user account at a desired service provider (e.g., which a system administrator will review and respond to), changing a password required to access user interface 400, etc.

In some embodiments, the services accessible to a particular user may depend on a position or rank within the company (e.g., defined by inclusion in a group called "Managers" or "Executives"). For example, managers or executives may have access to some service providers or some services for a given service provider that non-managers and non-executives may not. In one example, an employee training service provider provides online training for all employees of a company. However, managers have to do additional training which non-managers are not required to complete. In that example, two employees both have access to the same service provider (e.g., they would both see an icon for the training service provider in user interface 400) but the specific services that are accessible would vary (e.g., after clicking on the icon for the training service provider in user interface 400). In another example, an employee has access to a particular service provider based on their position within a company. For example, a company may provide a car service for executives but does not offer this benefit to non-executives. Access to a reservation system associated with the car service may be restricted to executives in that example and executives would see an icon for a car service in user interface 400 whereas non-executives would not.

FIG. 5A is a diagram showing an embodiment of a user interface associated with one button user account deactivation. In some embodiments, the third exemplary canonical feature shown in FIG. 2 is provided via the user interface shown. In user interface 500, a user (e.g., system administrator 113 in FIG. 1) is deactivating user accounts for an employee, John Smith. Deactivation button 502 is pressed and in response the user interface shown in the next figure is presented.

Figure 5B:
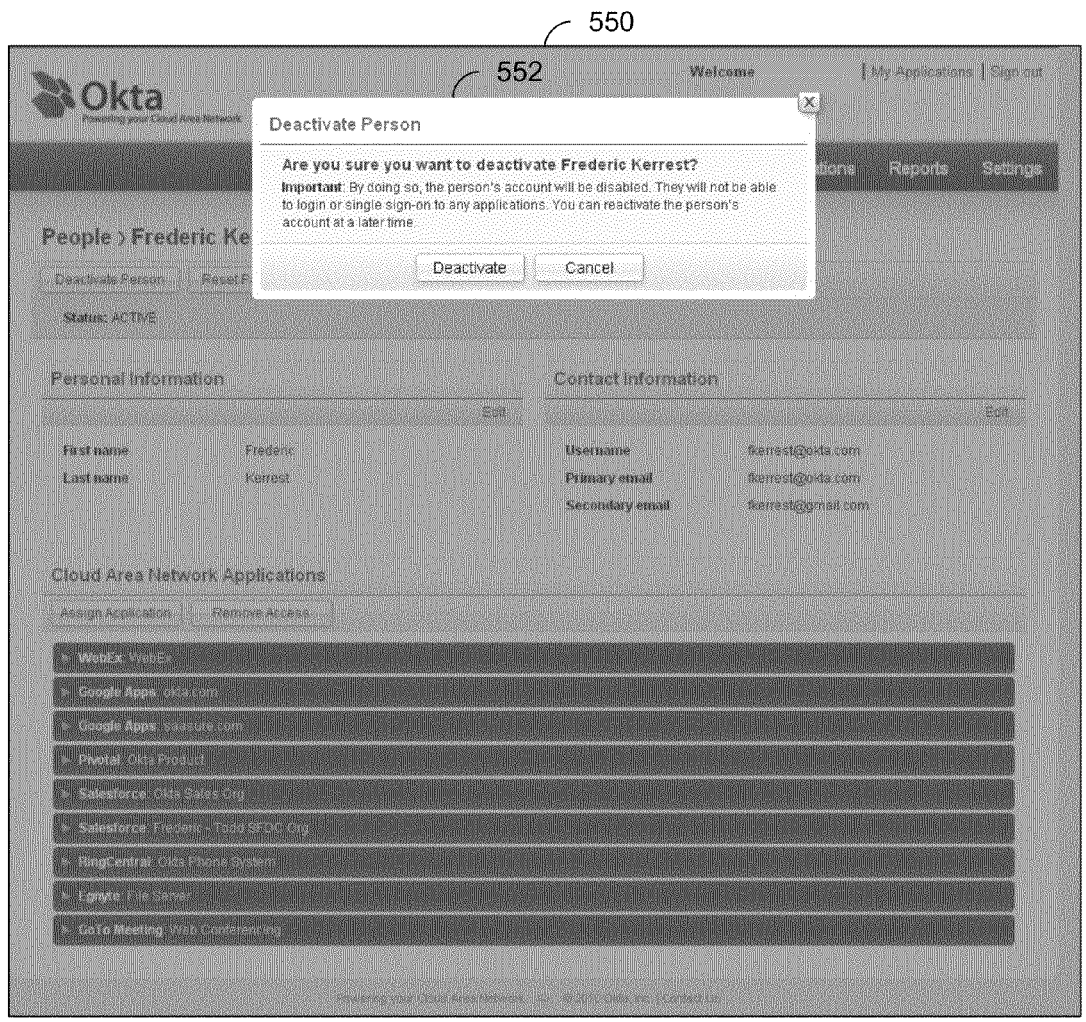
FIG. 5B is a diagram showing an embodiment of a user presented in response to pressing a deactivation button.

FIG. 5B is a diagram showing an embodiment of a user presented in response to pressing a deactivation button. In the example shown, user interface 550 is presented in response to pressing deactivation button 502 in FIG. 5A. Confirmation screen 552 is presented to a user (e.g., a system administrator) and asks the user to confirm deactivation or cancel the deactivation request.

In some embodiments, user interface 500 and 550 shown in FIGS. 5A and 5B are accessible via administration icon 406 in FIG. 4.

Figure 6:
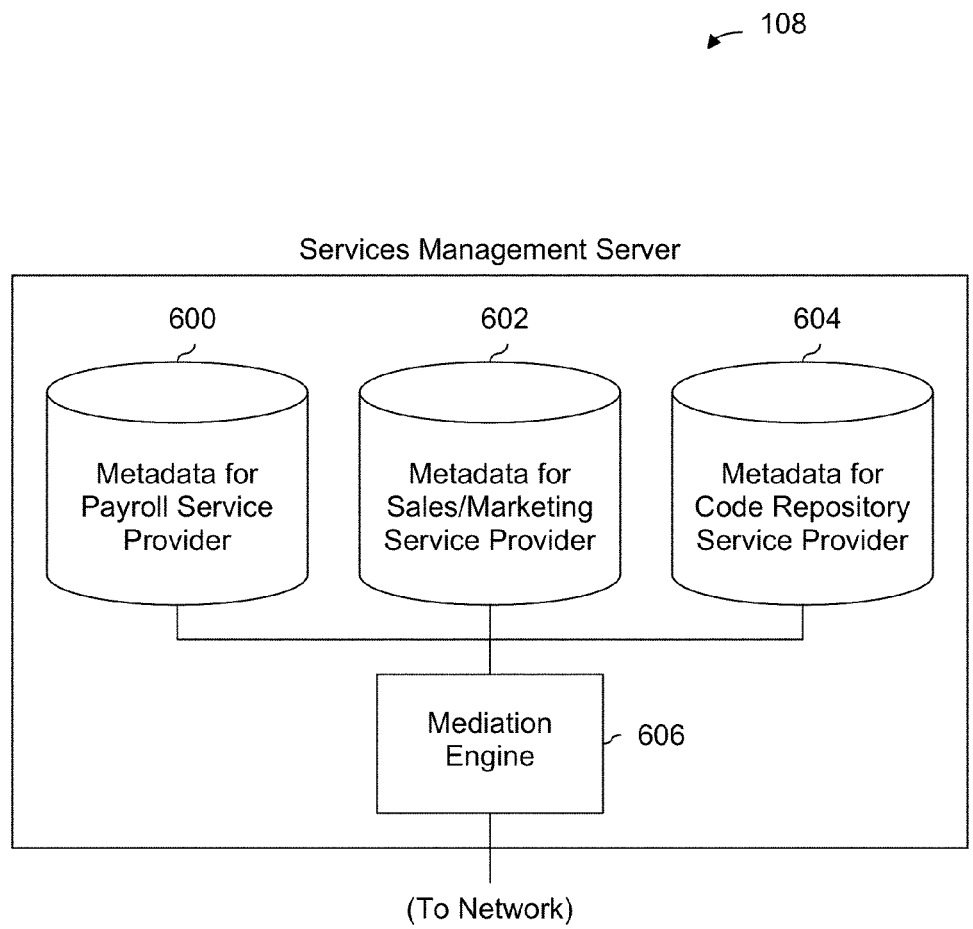
FIG. 6 is a diagram showing an embodiment of a services management server.

FIG. 6 is a diagram showing an embodiment of a services management server. In some embodiments, services management server 108 in FIG. 1 includes the components shown. In this example, the services management server stores metadata describing how canonical services are provided by payroll service provider 100, sales/marketing service provider 101, and code repository service provider 102 associated with FIG. 1.

Metadata as used herein is any information or data describing or associated with a service provider. The metadata may include information associated with canonical feature (e.g., whether a canonical feature is supported by a service provider) and/or may include information associated with an action (e.g., an underlying action used by a particular service provider to support a particular canonical service). In some embodiments, metadata 600 includes information from the left column of table 200 in FIG. 2, metadata 602 includes information from the middle column of table 200, and metadata 604 includes information from the right column of table 200. In some embodiments, metadata includes software code, code snippets, executable instructions, processes, or other functionality for communicating with or interacting with a service provider to perform one or more tasks in order to accomplish a desired canonical service. In some embodiments, metadata indicates or describes what function or process to execute or call. In some embodiments, metadata includes what settings or values to provide or populate a function or process with. Some specific examples of metadata are described in further detail below.

Mediation engine 606 uses the appropriate metadata associated with a service provider to interact with a service provider in order to perform a requested action. For example, If a user requests an action associated with the payroll service provider then mediation engine 606 accesses metadata 600 associated with the payroll service provider and interacts via a network with payroll service provider (100 in FIG. 1) as prescribed by metadata 600.

In some embodiments, mediation engine 606 includes information associated with one or more employees. For example, mediation engine may store user names and passwords for each of plurality of service providers an employee has. Referring back to FIG. 1 for example, mediation engine 606 may store user names and passwords for the services that employee 110 has access to, user names and passwords for the services employee 111 has access to, etc. In some embodiments, mediation engine 606 includes information associated with a company (e.g., MyCompany in FIG. 1). There may be a plurality of end user companies and each end user company may have a different set of requirements or canonical features.

In some embodiments, mediation engine 606 includes one or more translators, or mediators, functions, executables, or processes for communicating with a service provider in order to support a canonical service. In some embodiments, metadata (e.g., 600, 602, or 604) indicates which such process (located in mediation engine 606) to use and mediation engine 606 performs or runs the indicated process. For example, returning back to FIG. 2, there may be a process included in mediation engine 606 configured to communicate with or interact with a proprietary API in order to provide support for a central point of user account creation (top row, right column in table 200 in FIG. 2) and there may be another process within mediation engine 606 configured to interact with a SAML type interface (middle row, middle column in table 200). In some embodiments, formats, variables, fields, settings, or values (e.g., input or passed to an executed process) are obtained from metadata and passed to the appropriate process within mediation engine 606.

Using a metadata based platform as described herein to manage multiple service providers provides a number of advantages. For example, from the point of view of end users such as employees 110-113 in FIG. 1, using a metadata based platform enables those end users to have a uniform experience with respect to all service providers, regardless of how each service provider implements or supports a particular canonical feature. For example, with respect to single sign on in FIG. 2, by describing in metadata how each service provider implements or supports that canonical feature permits a user to have the same experience for the payroll service provider, the sales/marketing service provider, and the code repository service provider even though two of them use a proprietary API and one uses a SAML type interface. They can, for example, access those applications without knowing the underlying mechanism is different (e.g., proprietary API vs. SAML). The user experience is also consistent and seamless as service providers upgrade or otherwise change how they support a particular canonical feature. A change from a proprietary API to a SAML type interface, for example, by the service provider would not be noticed or perceived by an end user since the user experience would be the same both before and after the change.

Some advantages of using a metadata based platform as described herein become apparent in a dynamic environment where service providers are making improvements and changes to their systems on a fairly regular basis. Using metadata to describe how to interact with a particular service provider enables code or functionality to be reused, for upgrades to be supported seamlessly, and for the code or functionality used to interact with service providers to be decoupled from the metadata (e.g., describing how to interact those service providers). In one example, a service provider upgrades its systems at midnight on a certain day. If that service provider (or a services management server which knows about the upgrade in advance) changes the associated metadata at midnight to reflect the system changes then end users such as employees 110-113 in FIG. 1 will not notice any disruption of service. Another advantage is the reuse of code or other functionality. For example, if the upgraded system requires a similar interaction as a second service provider then code or functionality created to interact with the second service provider can be reused and no new code or functionality needs to be written. Another advantage is the ability to separate (if desired) the information describing how to interface with a particular service provider for a particular canonical feature or action with the various functionality or code used for interacting with various service providers for various tasks. For example, this may enable a limited group of people to manage and update the processes or code used to interact but permits the metadata (excluding any code snippets or functionality for interacting) to be updated by a larger group of people. This may be desirable since having too many people being able to edit code may increase the likelihood of a bug or a crash, but having many people update the metadata (again, excluding any code snippets or functionality for interacting) may distribute the responsibility of tracking and managing upgrades at the various service providers amongst a larger group of people, thus enabling changes to be detected and reflected in metadata faster.

Figure 7:
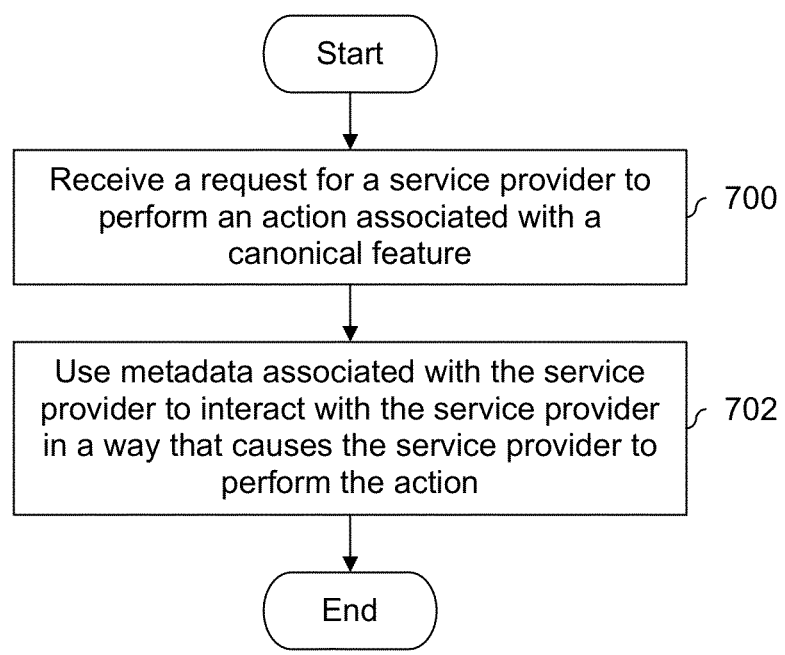
FIG. 7 is a flowchart illustrating a process for managing a plurality of service providers.

FIG. 7 is a flowchart illustrating a process for managing a plurality of service providers. In some embodiments, the process is performed by mediation engine 606 in FIG. 6. A request is received for a service provider to perform an action associated with a canonical feature at 700. For example, a request is received at services manager 108 from engineer 112 and the requested action is associated with logging in order to access services associated with code repository service provider 102 in FIG. 1. In another example, referring back to FIG. 5A, a request may be triggered by pressing deactivate button 502. In that particular example, multiple service providers (i.e., WebEx, Google Apps, . . . , and GoTo Meeting) will perform the action. Other services providers for which John Smith does not have an account (not shown) will not necessarily perform the requested deactivation action.

At 702, metadata associated with the service provider is used to interact with the service provider in a way that causes the service provider to perform the action. For example, if the request is associated with Salesforce then mediation engine 606 may use metadata 602 in FIG. 6 to interact with sales/marketing service provider 101 in FIG. 1. In some embodiments, metadata includes a code snippet for communicating with a service provider to perform the requested action. In some embodiments, metadata indicates what process or functionality to use and that process or functionality is located external to the metadata.

Figure 8:
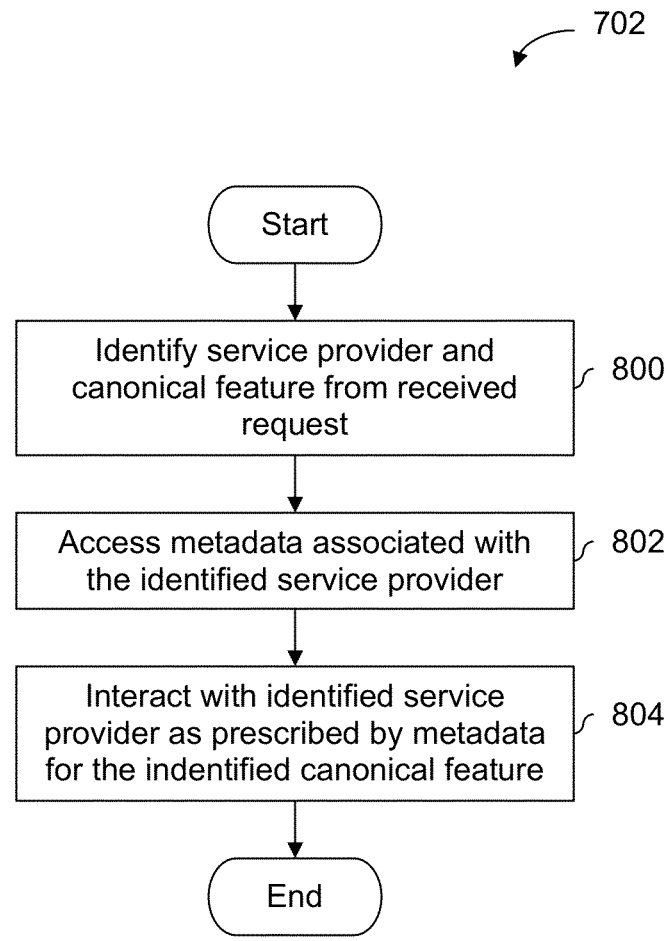
FIG. 8 is a flowchart illustrating an embodiment of a process for interacting with a service provider based at least in part on metadata.

FIG. 8 is a flowchart illustrating an embodiment of a process for interacting with a service provider based at least in part on metadata. In some embodiments, step 702 in FIG. 7 is performed as shown.

At 800, a service provider and a canonical feature are identified from a received request. For example, if the request is triggered by selecting the radio button for WebEx in window 352 in FIG. 3B, then the service provider is WebEx and the canonical feature is associated with a central point of user account creation. Metadata associated with the identified service provider is accessed at 802. To continue the previous example, metadata associated with WebEx is retrieved (e.g., from the services management server if stored there). The identified service provider is interacted with as prescribed by metadata for the indentified canonical feature at 804. In some embodiments, metadata includes a code snippet for this purpose.

Figure 9:
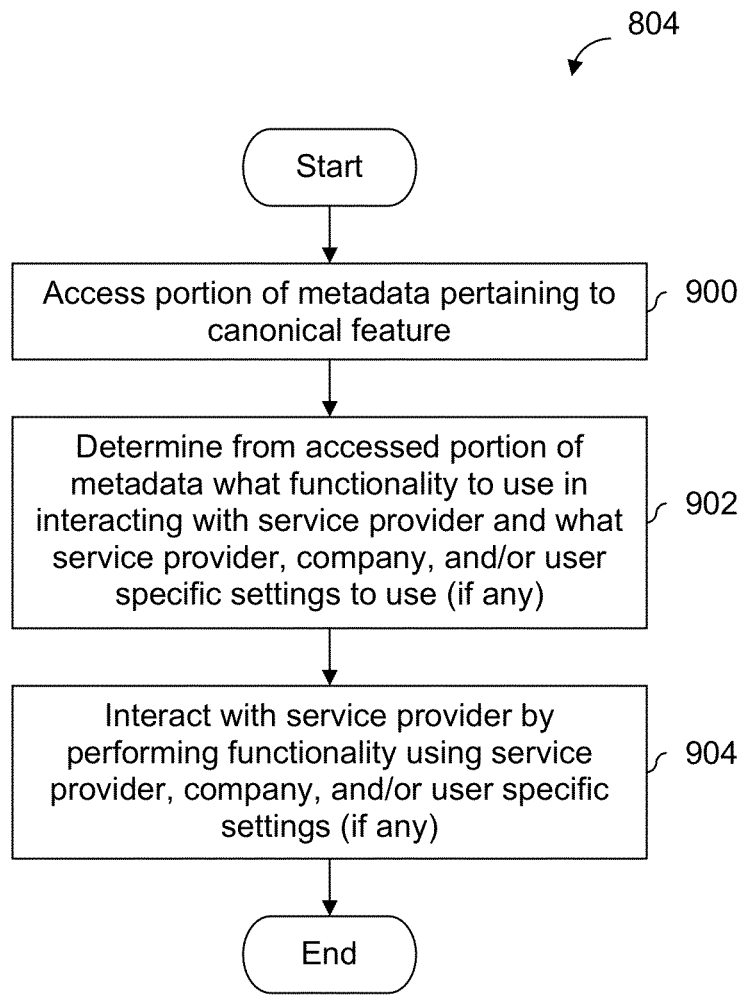
FIG. 9 is a flowchart illustrating an embodiment of a process for interacting with a service provider according to metadata.

FIG. 9 is a flowchart illustrating an embodiment of a process for interacting with a service provider according to metadata. In some embodiments, the example process is used in step 804 of FIG. 8. A portion of metadata pertaining to a canonical feature is accessed at 900. For example, in some embodiment a canonical feature maps to or is associated with one or more portions of the metadata. In some embodiments, metadata for all service providers (e.g., independent of whether a canonical feature is supported and (if so) the manner in which the service provider supports it and/or that service provider is interacted with) has a same section marker, identifier, or instantiation for a given canonical feature to indicate that that portion of the metadata corresponds to that particular canonical feature. For example, metadata 600, 602, and 604 each includes a section maker <canonical feature 1>, <canonical feature 2>, and <canonical feature 2>. In some other embodiments, metadata for all services provider includes a section listing those canonical features (if any) that are supported by that service provider. For example, metadata, 600, 602, and 604 includes a section marker <supported canonical features>.

At 902, it is determined from an accessed portion of metadata what functionality to use in interacting with a service provider and what service provider, company, and/or user specific settings to use (if any). A service provider is interacted with by performing the functionality using the service provider, company, and/or user specific settings (if any) at 904. In some embodiments, a code snippet, executable, or other functionality is included in the metadata itself. In some embodiments, the accessed portion of metadata indicates what function or process to call and the executed function or process interacts with the service provider. For example, referring back to FIG. 2, metadata for the sales/marketing service provider (center column) indicates that a "SAML interaction" function should be used and metadata for the code repository service provider (right column) indicates that a "proprietary API interaction" function should be used.

If needed, the functionality is provided or pre-populated with settings, for example that are associated with the service provider (e.g., payroll service provider 100 in FIG. 1), the company (e.g., MyCompany), and/or the employee (e.g., director of marketing 110 in FIG. 1). Some examples of settings include locations or URL's (e.g., with which the process or function interacts or communicates with), credentials (e.g., user names or passwords). In some embodiments, these settings are obtained from metadata (e.g., if the setting is associated with a particular service provider) and/or from storage (e.g., if the setting is associated with a particular employee or company).

Figure 10:
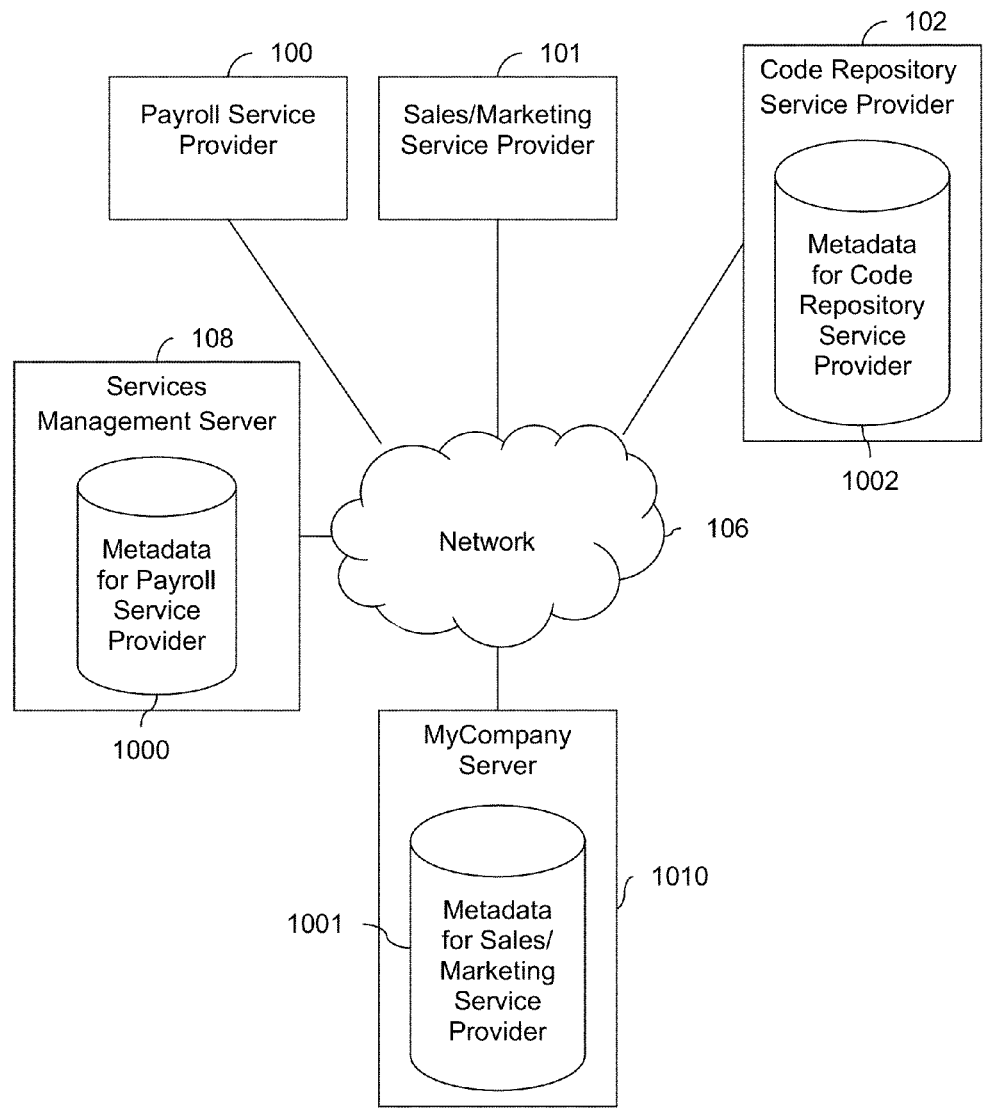
FIG. 10 is a diagram showing an embodiment of metadata managed by and stored at a variety of locations.

FIG. 10 is a diagram showing an embodiment of metadata managed by and stored at a variety of locations. In the example shown, metadata is generated by a variety of entities and is stored in a variety of locations. Metadata 1000 is associated with payroll service provider 100 and is generated by and stored at services management server 108. Any changes at payroll service provider 100 (e.g., if a canonical features goes from unsupported to supported or an exposed interface changes) are correspondingly updated in metadata 1000 by services management server 108. In one example, payroll service provider 100 does not have the interest and/or ability to generate metadata 1000 and services management server 108 generates metadata 1000 because it believes many of its customers (e.g., MyCompany) want or will want access to services of payroll service provider 100 in the manner described herein.

Metadata 1001 is associated with sales/marketing service provider 101 and is generated by and stored at MyCompany server 1010. Server 1010 is sometimes referred to as an end user server. In one example, employees at MyCompany want to use services of sales/marketing service provider 101 in the environment described herein and generated metadata 1001 in order to achieve this.

Metadata 1002 is associated with, generated by, and stored at code repository service provider 102. Code repository service provider 102 may have generated metadata 1002 to enable its customers (e.g., MyCompany) to be able to use the services of code repository service provider.

FIG. 11 is a diagram showing an embodiment of metadata associated with a customer relationship management service provider. In the example shown, the service provider is Pivotal and the metadata is in XML format. For clarity, sections of the metadata in this figure and some later figures are expanded/contracted with horizontal dashed (out)lines showing where a section begins and ends. In the example shown, canonical features are not supported by this service provider (e.g., similar to the left column in FIG. 2). That is, there is no API or other functionality (e.g., defined or created using a standard interface or language, such as SAML) exposed by Pivotal by which the canonical features can be supported. Pivotal may (for example) only expect to interact with a user by having that a user go directly to their website (e.g., www.pivotal.com) and access their services directly via their website as opposed to another interface (e.g., the interfaces shown in FIGS. 3A-5B).

In 1150, the metadata shows the version number (i.e., 3) and the location at which the metadata is stored (i.e., http://www.okta.com/schema/metadata/upgrade). In this particular example, the metadata is stored at a services management server (e.g., 108 in FIG. 1).

In 1152, the metadata is shown with an add application section (1102) expanded. Section 1102 includes general information associated with the service provider including the URL of the website, a name to display, and a description of the service provider. Section 1102 also includes a links section (1104) and an ssoProtocols section (1106) which are described in further detail below.

In 1154, links section 1104 and ssoProtocols section 1106 are shown in expanded detail. In this and other subsequent examples, a links section includes metadata related to a graphical user interface in which a plurality of service providers is displayed. For example, the information included in links section 1104 is used to generate and display pivotal icon 408 in FIG. 4. ssoProtocols section 1106 is associated with single sign on and the mode value of exclusive indicates that that service provider only supports one single sign on technique or interaction. In some embodiments, a service provider supports two or more single sign on techniques (e.g., both SAML and an OpenID API) and the value of mode would be set to non-exclusive.

As described above, this particular service provider does not support canonical features. To make interaction with this service provider as convenient as possible, ssoProtocols section 1106 (securely) stores the user name and user password so that a user (e.g., any of employees 110-113 in FIG. 1) do not have to remember and/or enter it in. Section 1106 in the metadata enables a processor (e.g., mediation engine 606 in FIG. 6) to know where to log on (e.g., https://www.pivotaltracker.com/signin), a manner in which to exchange information (e.g., post), what fields exist (e.g., user name and password), what values to populate the fields with. In some embodiments, this process of going to a log on URL, populating fields at that URL, and posting (i.e., returning or entering) those populated values is triggered when a user clicks on an icon from a single point of access (e.g., clicks on icon 408 in FIG. 4).

In some embodiments, some sections of the metadata shown herein are (re)used in other metadata if the service provider corresponding to that metadata has a similar interface. For example, suppose Saleforce 404 in FIG. 4 similarly did not support a SAML sign on. In some embodiments, metadata for Salesforce would include a secure password store section, but the number of fields, the field names, and/or the field values may differ as appropriate from the example shown in 1106.

FIG. 12A is a diagram showing an embodiment of metadata associated with a multiservice service provider. As used herein, a multiservice service provider is any service provider which provides more than one service or application. In the example shown, Google provides four services: an email application, a document viewing and editing application, a calendar application, and a webpage creation and editing application. The service provider in this example supports a plurality of canonical features (as opposed to Pivotal in FIG. 11).

In 1250, a version number (47) and location at which the metadata is stored are shown. In 1252, metadata relating to the website, display name, description, and sort order are shown in add applications section 1202. In some embodiments, the value of the sort order is used to determine what order to display items in (e.g., the order in which to display icons in FIG. 4).

Supported features section 1204 is shown in expanded detail in 1254. In this example, five canonical features are supported by Google: importing new users (e.g., from Google into a services management server), importing profile updates (e.g., for an existing user from Google into a services management server), pushing new users (e.g., from a services management server to Google), pushing profile updates (e.g., changing first/last names, permissions, job titles, etc. from a services management server to Google), and pushing password updates (e.g., to reset a password, to set a new password that meets new password requirements such as when a company goes from only have requirements regarding password length to one that further requires a capital letter, special character, or number).

FIG. 12B is a diagram showing an embodiment of metadata associated with a multiservice service provider with a links section expanded. Links section 1206 is shown in 1256 with four links associated with mail, documents, calendar, and sites. In some embodiments, links section 1206 is used to generate and display the four icons associated with Google Mail, Google Docs, Google Calendar, and Google Sites in FIG. 4.

FIG. 12C is a diagram showing an embodiment of metadata associated with a multiservice service provider with an organization properties section expanded. In 1258, organization properties section 1208 includes three properties: domain, administrator user name, and administrator password. In this example, the service provider (i.e., Google) requires information identifying the end user company and the domain propriety is used to obtain this information from an end user and/or provide it to Google. Some other service providers (e.g., Pivotal in the example of FIG. 11) do not require this and this property would not be included in metadata for those service providers.

FIG. 12D is a diagram showing an embodiment of metadata associated with a multiservice service provider with a single sign on (SSO) protocols section expanded. In the example shown, SSO protocols section 1210 includes a bookmark section and a SAML section. In one example usage, the bookmark section in SSO protocols section 1210 is used to allow the administrators to quickly test out the home page of a services management server (e.g., Okta) without changing their configuration of a service provider, such as Google, itself. For example, they don't have to turn on single signon from their Google admin console—they can see the Google icon on their okta homepage, click on it to navigate to the Google signon. This is not necessarily true for single signon (just a book mark) but let's them see quickly how the okta homepage would work. The SAML section in SSO protocols section 1210 is used to interact with the SAML interface of the multiservice service provider during single sign on (e.g., the multiple URLs are different URLs required for the SAML handshake in this example).

FIG. 13A is a diagram showing an embodiment of metadata associated with a sales/marketing service provider. For brevity, a collapsed version of the exemplary metadata corresponding to 1150 and 1250 in FIGS. 11 and 12A, respectively, is not shown. In this example, the sales/marketing service provider is Salesforce. In 1352, metadata for the sales/marketing service provider is shown with an add application section (1302) expanded. Links section 1304 is shown expanded in 1354. In some embodiments, links section 1304 is used to generate and display icon 404 in FIG. 4.

FIG. 13B is a diagram showing an embodiment of metadata associated with a sales/marketing service provider with a custom types section expanded. In 1356, custom types section 1306 contains or describes information specific to the particular service provider. Custom types section 1306 includes two custom types: a profile and a role. In this example, a profile includes information specific to a particular employee (e.g., marketing employee 111 in FIG. 1) and a role includes information associated with a job profile (e.g., all marketing employees having a job title of "product marketing engineer"). This service-specific information is used by the service provider (i.e., Salesforce) in providing services to a user.

FIG. 13C is a diagram showing an embodiment of metadata associated with a sales/marketing service provider with an organization properties section expanded. In the example shown, organization properties section 1308 includes two properties: admin user name and admin password. In the example shown, both the admin user name property and admin password property include help text indicating (respectively) what information to provide for the admin user name and what information to provide for the admin password, including how to obtain a security token.

FIG. 13D is a diagram showing an embodiment of metadata associated with a sales/marketing service provider with a user properties section expanded. User properties section 1310 in this example includes two properties: a profile and a role. In some embodiments, the custom types profile and role defined in custom types section 1306 in FIG. 13B are used, instantiated, or called here in user properties section 1310.

FIG. 14 is a diagram showing an embodiment of an integration summary. In the example shown, an integration summary is generated and displayed for a single service provider for a plurality of canonical features. Display 1400 indicates whether canonical features related to user sign on and canonical features related to user management are supported.

Message 1402 is associated with user lock out, a canonical feature associated with user management. In this particular example, user lock out is not supported and message 1402 is a warning message that a user is still able to directly access services even if a user's account is deactivated at the services management server. In some embodiments, message 1402 is a rollover message presented when a mouse pointer is positioned over the text "user lock out" in display 1400.

In some embodiments, integration summary 1400 is generated using metadata associated with a service provider of interest. For example, metadata associated with a service provider may be parsed to determine what canonical features, if any, are supported by a service provider of interest. The supported column in display 1400 is then populated with a "Yes" or a "No" depending upon the metadata for that particular canonical feature.

In some embodiments, an integration summary is generated and displayed for multiple service providers so that the viewer can see how two or more service providers—possibly competitors—compare in their integration. For example, such a display may be presented to a service provider to encourage them to support the various canonical features. A service provider may be encouraged to further support canonical features if a competitor does but they do not. In some embodiments, a display is presented to a system administrator or other representative of an end user company (e.g., MyCompany) to demonstrate for one or more desired service providers whether canonical features are supported (e.g., if MyCompany is evaluating whether to acquire the services of services management server 108 in FIG. 1).

FIG. 15 is a diagram illustrating an embodiment of a management interface. In the example shown, interface 1500 is presented to and used by a system administrator at an end user company (e.g., 113 in FIG. 1). In the example shown, interface 1500 displays status information and reports for a service provider of interest including notifications from the system (1502), an overview of activity related to the service provider (1504), and the status of integration of canonical features for that service provider (1506). In some embodiments, a system administrator is able to generate activity or usage reports. For example, a system administrator may be able to see dates/times when a user logged on, what services were requested, what information was exchanged, etc. This may be desirable for auditing purposes or to ensure that employees are using services in a manner prescribed by and/or that is not detrimental to the company.

In some embodiments, interacting with interface 1500 causes metadata associated with a service provider or saved information (e.g., associated with a one or more employees of a company) to be updated or otherwise changed. For example, editing the logo and/or label for Salesforce using interface 1500 may cause metadata in links section 1304 in FIG. 13A to change. In another example, a user is locked out and the system administrator resets that user's password. This resetting of the password (or other change is a setting, privilege, or status of a user) may be reflected in stored information associated with that user.

In some embodiments, there is an interface (e.g., similar to that shown in FIG. 15) presented to and used by an administrator at a service provider. For example, a system administrator at an end user company (e.g., 113 in FIG. 1) may generate a request or message to be sent to a particular service provider (e.g., 100). The request may be a request for support (e.g., letting them know the service is down or a link is broken), a request for new features or services, or a request to migrate or elevate up a support level of one or more canonical features (e.g., a request may be sent to the payroll service provider in FIG. 2 to support a central point of user account creation and/or one button user account deactivation or to code repository service provider to move from a proprietary API to an industry standard such as SAML). In particular, a request to upgrade or migrate support may be more compelling coming from an end user company than a similar request from a services management service and may encourage service providers to provide support where none existed before to move to a more commonly used industry standard from a proprietary interface. In some embodiments, a communication or message is sent from a services management server to an administrator or other user at a service provider. In one example, if a service provider goes down, a message is sent to all customers of the service management server. These exemplary communications (and their responses, if any) may be accessed and managed via an interface similar to that shown in FIG. 15. Other features (such as generating reports and managing information associated with user accounts, company-level account information, etc.) may also be accessed via such an interface.

The following figures show some embodiments of user interfaces and metadata associated with single sign on performed using a secure password store or performed using a browser plugin (e.g., into Mozilla Firefox or Microsoft Internet Explorer). In a secure password store technique, login information (e.g., some examples of which are shown in the metadata examples above) is stored securely and is posted and provided to the service provider so that the user is logged in without the user having to intervene. In some cases, a service provider is implemented using Java script and/or stored cookies and a secure password store technique is not be able login the user. In some embodiments, a browser plugin is used to perform single sign on in such cases. First, some metadata embodiments are shown and then some user interfaces associated with a browser plugin are shown.

FIG. 16A is a diagram showing an embodiment of metadata associated with a browser plugin for single sign on. In the example shown, metadata 1600 includes ssoProtocols section 1602. In this example, the login page of the service provider is described in loginRedirectURL and the scripts "select company," "login," and "ajax-login" are associated with and executed at the respective URLs specified.

FIG. 16B is a diagram showing an embodiment of metadata associated with a secure password store technique used to perform single sign on. In the example shown, metadata 1600 includes ssoProtocols section 1604 which specifies or otherwise indicates a secure password store technique (e.g., as opposed to other techniques for performing single sign on if supported). The URL at which login is performed is described or otherwise specified in postBackURL, the technique is set to "post," and login information (such as user name and password) are also specified.

Figure 17A:
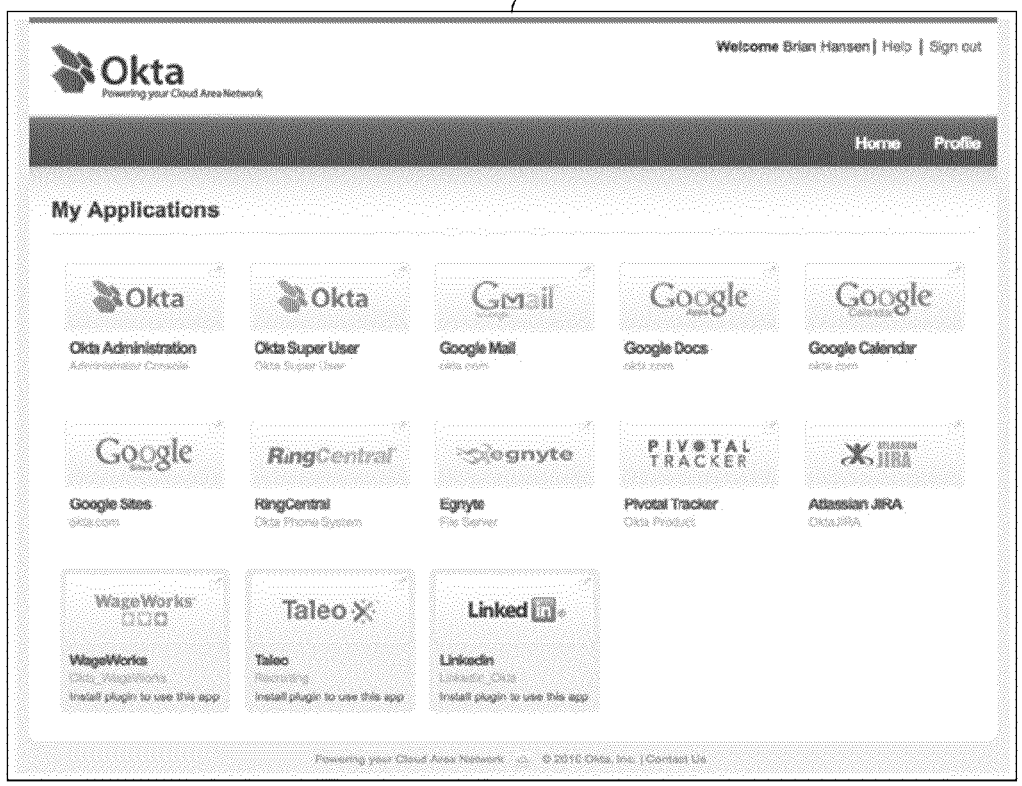
FIG. 17A is a diagram showing an embodiment of a user interface indicating a browser plugin needs to be installed.

FIG. 17A is a diagram showing an embodiment of a user interface indicating a browser plugin needs to be installed. In the example shown, the service providers WageWorks, Taleo, and LinkedIn require the use of a browser plugin in order to use the services provided by those service providers. In this example, those icons are highlighted and have a message of "install plugin to use this app." In some embodiments, those service providers have a Java script interface and a secure password store technique will not work to login in a user.

Figure 17B:
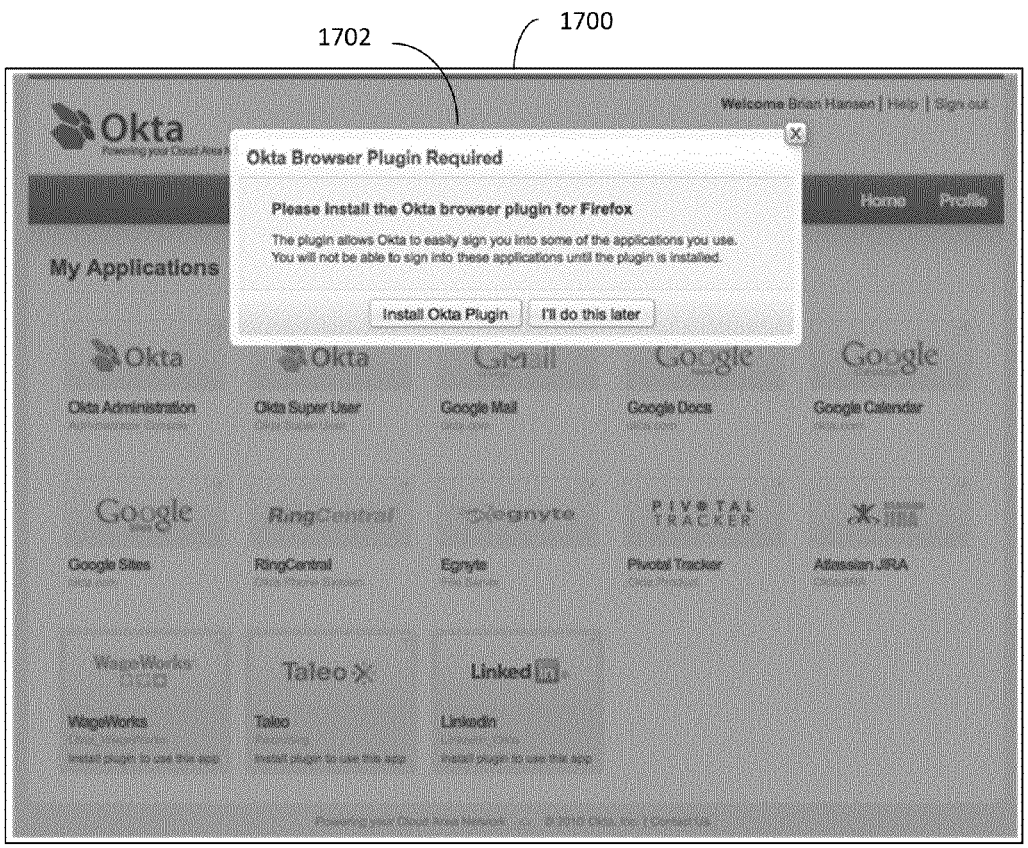
FIG. 17B is a diagram showing an embodiment of a user interface with a popup message indicating a browser plugin is required.

FIG. 17B is a diagram showing an embodiment of a user interface with a popup message indicating a browser plugin is required. In various embodiments, a variety of events trigger display of popup message 1702 such as when a user first accesses a URL associated with user interface 1700 or when a user clicks on any of the icons associated with the WageWorks, Taleo, or LinkedIn. In this example, only a single browser plugin is required and once installed will permit single sign on to WageWorks, Taleo, or LinkedIn. Popup message 1702 is optional and in some embodiments is not displayed to avoid annoying a user.

FIG. 17C is a diagram showing an embodiment of a user interface after a browser plugin has been installed. In the example shown, the icons for WageWorks, Taleo, and LinkedIn are no longer highlighted and the install message (i.e., "install plugin to use this app") is no longer presented.

Figure 17D:
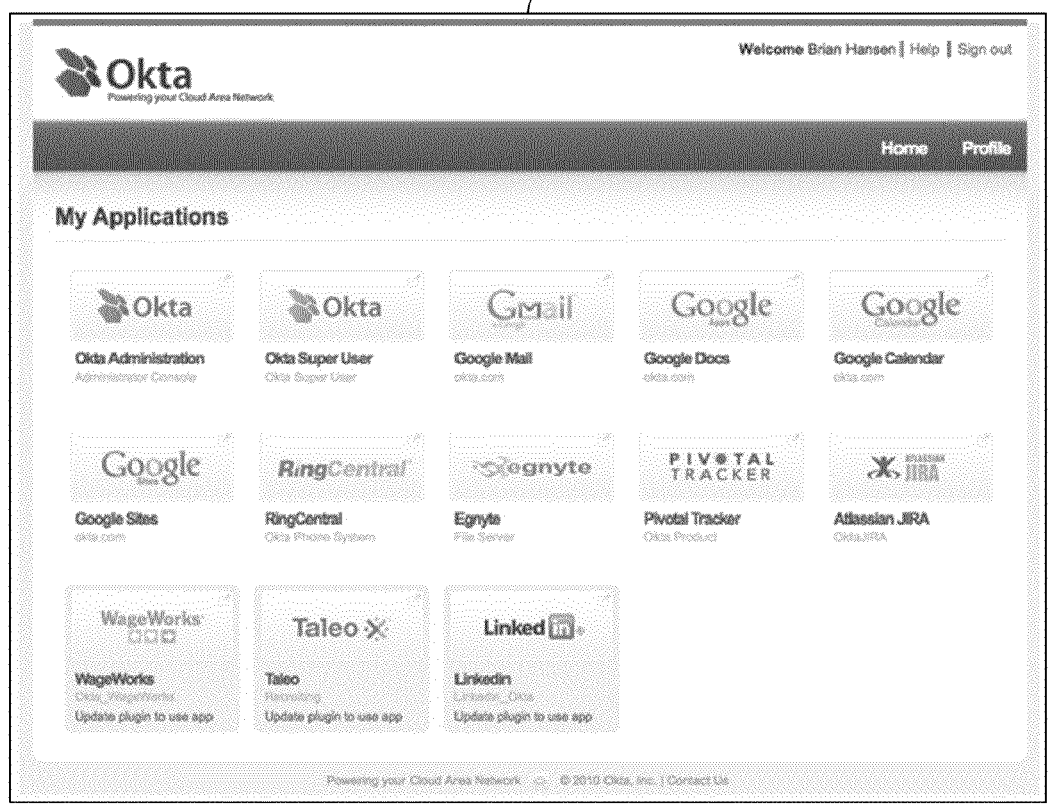
FIG. 17D is a diagram showing an embodiment of a user interface indicating a browser plugin needs to be updated.

FIG. 17D is a diagram showing an embodiment of a user interface indicating a browser plugin needs to be updated. In this example, icons associated with WageWorks, Taleo, and LinkedIn are highlighted and indicate a browser plugin needs to be updated to use the services associated with those service providers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing a request for a particular service provider to invoke a canonical feature that is supported by the particular service provider and by additional service providers, the method comprising:
   identifying metadata associated with the particular service provider;
   accessing, within the identified metadata, a metadata portion associated with the canonical feature, wherein the canonical feature comprises a central point of user account management for the particular service provider and for the additional service providers;
   determining, based on the metadata portion, an executable function that causes the particular service provider to invoke the canonical feature; and
   executing the executable function, thereby causing the particular service provider to invoke the canonical feature.

2. The method of claim 1, further comprising
   determining, based on the metadata portion, a setting associated with the executable function,
   wherein the executable function is executed according to the setting.

3. The method of claim 1, wherein the identified metadata is stored at one or more of the following: the particular service provider, a services management server, or an end user server.

4. The method of claim 1, wherein the identified metadata includes information indicating which canonical features are supported by the particular service provider.

5. The method of claim 1, wherein the identified metadata indicates a manner in which the particular service provider supports the canonical feature.

6. The method of claim 1, wherein the executable function comprises a process for interacting with a proprietary API associated with the particular service provider.

7. The method of claim 1, wherein the executable function comprises a segment of software code associated with the particular service provider.

8. The method of claim 1 further comprising changing the identified metadata to reflect a change at the particular service provider.

9. The method of claim 8, wherein the change is associated with a change to an underlying manner in which the particular service provider supports the canonical feature.

10. The method of claim 8, wherein the change is associated with a change to an interface associated with the particular service provider.

11. The method of claim 8, wherein a user experience before and after the identified metadata is changed is the same.

12. A system for processing a request for a particular service provider to invoke a canonical feature that is supported by the particular service provider and by additional service providers, the system comprising:
   a processor; and
   a memory coupled with the processor, wherein the memory is configured to provide the processor with instructions which when executed cause the processor to:
      identify metadata associated with the particular service provider;
      access, within the identified metadata, a metadata portion associated with the canonical feature, wherein the canonical feature comprises a central point of user account management for the particular service provider and for the additional service providers;
      determine, based on the metadata portion, an executable function that causes the particular service provider to invoke the canonical feature; and execute the executable function, thereby causing the particular service provider to invoke the canonical feature.

13. A computer program product for processing a request for a particular service provider to invoke a canonical feature that is supported by the particular service provider and by additional service providers, the computer program product being embodied in a non-transitory computer readable storage medium and comprising computer instructions for:
   identifying metadata associated with the particular service provider;
   accessing, within the identified metadata, a metadata portion associated with the canonical feature, wherein the canonical feature comprises a central point of user account management for the particular service provider and for the additional service providers;
   determining, based on the metadata portion, an executable function that causes the particular service provider to invoke the canonical feature; and
   executing the executable function, thereby causing the particular service provider to invoke the canonical feature.

14. The method of claim 1, wherein user account management comprises user account creation.

15. The method of claim 1, wherein user account management comprises user account deactivation.

16. The method of claim 1, wherein the request further indicates a second canonical feature for the particular service provider to invoke that is supported by the particular service provider and by additional service providers, and wherein the second canonical feature comprises single-portal access to services from the particular service provider and from the additional service providers, the method further comprising:
   accessing, within the identified metadata, a second metadata portion associated with the second canonical feature;
   determining, based on the second metadata portion, a second executable function that causes the particular service provider to invoke the second canonical feature; and
   executing the second executable function, thereby causing the particular service provider to invoke the second canonical feature.

17. The method of claim 1, wherein the request further indicates a second canonical feature for the particular service provider to invoke that is supported by the particular service provider and by additional service providers, and wherein the second canonical feature comprises central performance management for the particular service provider and for the additional service providers, the method further comprising:
   accessing, within the identified metadata, a second metadata portion associated with the second canonical feature;
   determining, based on the second metadata portion, a second executable function that causes the particular service provider to invoke the second canonical feature; and
   executing the second executable function, thereby causing the particular service provider to invoke the second canonical feature.

18. The method of claim 1, wherein the request further indicates a second canonical feature for the particular service provider to invoke that is supported by the particular service provider and by additional service providers, and wherein the second canonical feature comprises a dashboard showing response times for the particular service provider and for the additional service providers, the method further comprising:
   accessing, within the identified metadata, a second metadata portion associated with the second canonical feature;
   determining, based on the second metadata portion, a second executable function that causes the particular service provider to invoke the second canonical feature; and
   executing the second executable function, thereby causing the particular service provider to invoke the second canonical feature.

19. The computer program product of claim 13, wherein the executable function comprises a process for interacting with a proprietary API associated with the particular service provider.

20. The computer program product of claim 13, wherein the executable function comprises a segment of software code associated with the particular service provider.

* * * * *